(12) United States Patent
Salapura et al.

(10) Patent No.: US 10,885,166 B2
(45) Date of Patent: Jan. 5, 2021

(54) COMPUTER SECURITY PROTECTION VIA DYNAMIC COMPUTER SYSTEM CERTIFICATION

(71) Applicant: International Business Machines Corporation, Armonk, NY (US)

(72) Inventors: Valentina Salapura, Chappaqua, NY (US); Ruchi Mahindru, Elmsford, NY (US); Anca Sailer, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 15/722,023

(22) Filed: Oct. 2, 2017

(65) Prior Publication Data
US 2019/0102527 A1 Apr. 4, 2019

(51) Int. Cl.
| G06F 21/00 | (2013.01) |
| G06F 21/31 | (2013.01) |
| G06F 21/30 | (2013.01) |
| G09B 5/08 | (2006.01) |
| G06F 21/55 | (2013.01) |
| G06F 21/45 | (2013.01) |

(52) U.S. Cl.
CPC ............ G06F 21/316 (2013.01); G06F 21/30 (2013.01); G06F 21/554 (2013.01); G09B 5/08 (2013.01); G06F 21/45 (2013.01)

(58) Field of Classification Search
CPC ........ G06F 21/316; G06F 21/30; G06F 21/45; G09B 5/08
See application file for complete search history.

(56) References Cited

U.S. PATENT DOCUMENTS

| 7,171,441 | B2 | 1/2007 | Shiouchi et al. |
| 9,607,058 | B1* | 3/2017 | Gupta ................... G06Q 50/184 |
| 2002/0152086 | A1 | 10/2002 | Smith et al. |
| 2002/0184520 | A1* | 12/2002 | Bush ...................... G06F 21/53 |
| | | | 726/6 |
| 2007/0185875 | A1 | 8/2007 | Chang et al. |
| 2009/0024850 | A1 | 1/2009 | Halcrow et al. |
| 2009/0089135 | A1* | 4/2009 | Minert ............. G06Q 10/06311 |
| | | | 705/7.13 |
| 2012/0216133 | A1* | 8/2012 | Barker .................. G06F 21/629 |
| | | | 715/760 |
| 2014/0101439 | A1* | 4/2014 | Pettigrew .............. H04L 9/3268 |
| | | | 713/156 |
| 2014/0302476 | A1* | 10/2014 | Sorensen .................. G09B 7/00 |
| | | | 434/307 R |

(Continued)

FOREIGN PATENT DOCUMENTS

WO    2014/031201 A2    2/2014

*Primary Examiner* — Mohammad W Reza
*Assistant Examiner* — Michael M Lee
(74) *Attorney, Agent, or Firm* — Scully, Scott, Murphy & Presser, P.C.; JoAnn Kealy Crockett

(57) ABSTRACT

A computer security protection may be provided by dynamic computer system certification. User usage of a computer system may be monitored. Based on the monitoring a role of the user in the usage of the computer system is determined. A certification required for the role and whether the user has the certification sufficient for the role are determined. Responsive to determining that the user does not have the certification sufficient for the role, a certification process is initiated.

14 Claims, 4 Drawing Sheets

(56) References Cited

U.S. PATENT DOCUMENTS

| | | | |
|---|---|---|---|
| 2014/0329210 A1* | 11/2014 | Masood | G06Q 10/103 |
| | | | 434/219 |
| 2014/0380484 A1* | 12/2014 | Choi | G06F 21/577 |
| | | | 726/25 |
| 2015/0010892 A1* | 1/2015 | Patrickson | G09B 7/00 |
| | | | 434/267 |
| 2015/0128249 A1* | 5/2015 | Alexandrian | G06F 21/629 |
| | | | 726/16 |
| 2015/0213460 A1* | 7/2015 | Anderson | G06Q 50/20 |
| | | | 705/318 |
| 2016/0063258 A1* | 3/2016 | Ackerly | G06F 21/602 |
| | | | 713/189 |
| 2017/0011308 A1* | 1/2017 | Sun | G06F 11/00 |
| 2019/0026634 A1* | 1/2019 | Homeyer | G06Q 10/103 |

* cited by examiner

COMPUTER SECURITY PROTECTION VIA DYNAMIC COMPUTER SYSTEM CERTIFICATION

FIELD

The present application relates generally to computers and computer applications, and more particularly to computer security, authentication and certification, and machine learning.

BACKGROUND

For computer security and compliance reasons, computer systems and computer applications may require that a user executing or invoking those computer systems and applications have the permitted security level for performing those computer jobs. At times, however, a user who is accessing or invoking a computer system or application may not have the required security level.

BRIEF SUMMARY

A method and system of protecting computer security by dynamic computer system certification may be provided. The method, in one aspect, may include monitoring user's usage of a computer system by determining commands the user executes on the computer system. The method may also include determining based on the monitoring a role of the user in the usage of the computer system. The method may further include determining certification required for the role. The method may also include determining whether the user has the certification sufficient for the role. The method may further include, responsive to determining that the user does not have the certification sufficient for the role, initiating a certification process, the certification process comprising determining a time for training based on the user's electronic calendar, automatically registering the user for the training on a training system, and at the time of the training, automatically connecting to the training system to allow the user to begin the training.

A computer security system with dynamic computer system certification, in one aspect, may comprise at least one hardware processor monitoring user's usage of a computer system by determining commands the user executes on the computer system. The at least one hardware processor may determine based on the monitoring a role of the user in the usage of the computer system. The at least one hardware processor may determine certification required for the role. The at least one hardware processor may determine whether the user has the certification sufficient for the role. Responsive to determining that the user does not have the certification sufficient for the role, the at least one hardware processor may initiate a certification process, the certification process may include determining a time for training based on the user's electronic calendar, automatically registering the user for the training on a training system, and at the time of the training, automatically connecting to the training system to allow the user to begin the training.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In one embodiment, the present disclosure addresses the problem of computer security and compliance when a user who is not authorized to perform a computer function or job attempts to perform that job. In one embodiment, the user may be provided with guidance to undergo the necessary training to get access.

A computer certification system and method in one embodiment may include dynamic role-based certification, for example, for compliance purposes like Health Insurance Portability and Accountability Act of 1996 (HIPAA), Payment Card Industry (PCI) Data Security Standard, General Data Protection Regulation (GDPR). Different computer users have various roles. For the various roles, different training may be needed for certifying that the users can perform the roles. In one embodiment, an automated machine learning system infers a role a user is performing on a computer or computer system, determines training needed based on the role, prompts training requests for that role if needed, and collects training proofs. The role change is determined dynamically, and a need for any additional training may be determined automatically. Proofs may be retained for auditing, for example, to prove compliance.

An automated system in one embodiment may validate proofs for team members by implementing a machine learning system to infer a role a user is performing on a computer system. In one aspect, the automated system may determine training needed based on the role, and prompt training requests for that role. The automated system may also learn valid proofs by using machine learning, and may also collect proofs and automatically check validity of the proofs. The automated system may also store proofs in a repository system, dynamically determine role changes, determine retraining needs and prompt or notify the user about the retraining needs.

Figure 1:
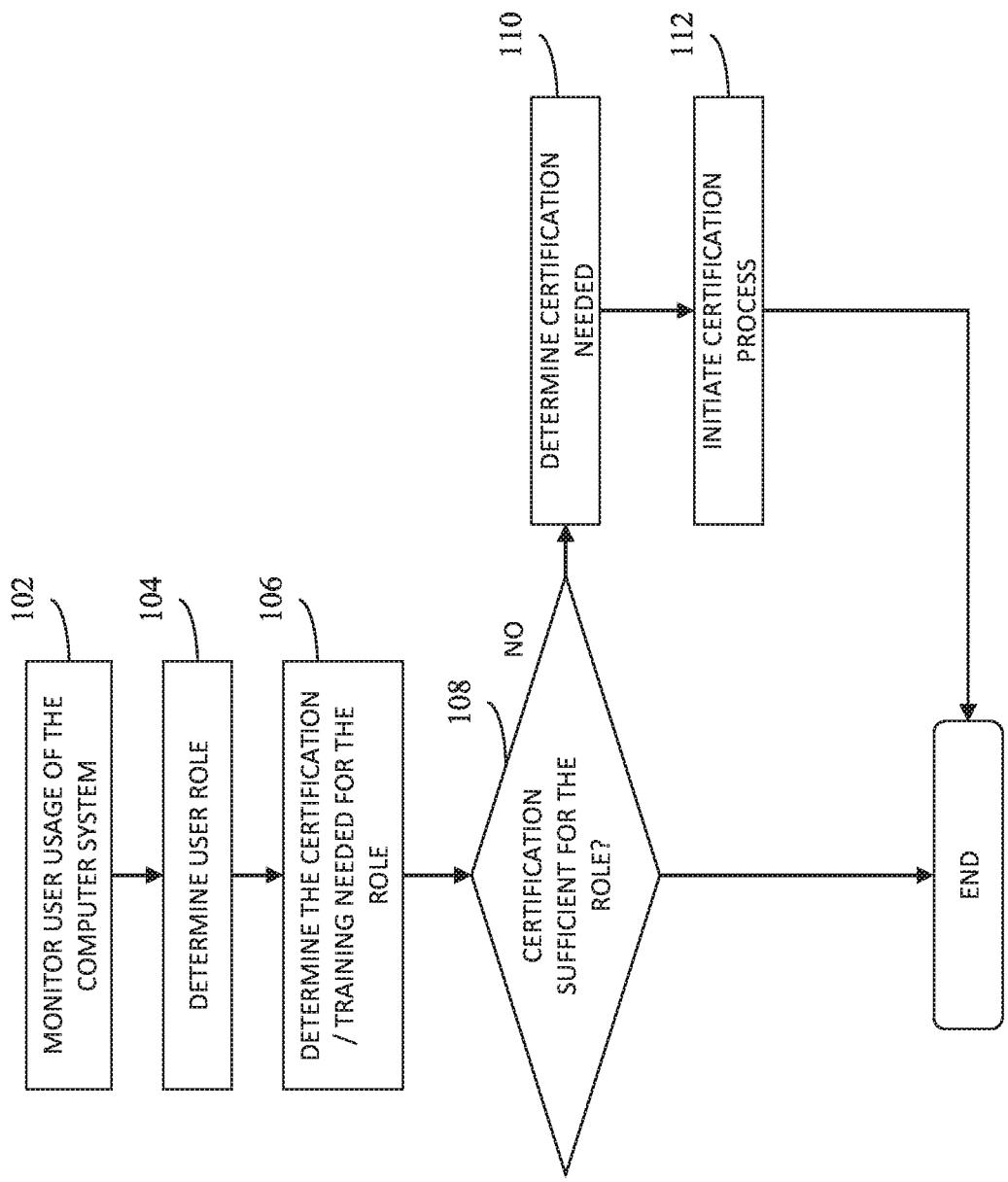
FIG. 1 is a flow diagram illustrating a method in one embodiment.

FIG. 1 is a flow diagram illustrating a method in one embodiment. The method may be executed on a computer system including at least one hardware processor. At 102, a hardware processor monitors user usage of the computer system. Monitoring can be performed in real time or offline by checking the history of the commands that the user was trying to invoke. Comparing the commands and level of actions with the predefined policies, the level of training required to be provided for access based on that level of policy may be determined. Example of commands that are intercepted may include, but not limited, to sudo, chmod (change mode of file to certain levels of read-write-execute), rpm or database system language or query commands on tables.

At 104, the user's role is determined. Comparing the commands and level of actions with the predefined policies, the role required to be provided for access based on that level of policy may be determined.

At 106, a certification and training needed for the role is determined. Based on the role determined in 104, the automated system of the present disclosure in one embodiment identifies the associated training required, based on predefined policies.

At 108, it is determined whether the current certification is sufficient for the role. This may be determined based on the current certification compared to the certification determined in 106.

At 110, if the certification is not sufficient for the role, certification needed is determined. For instance, if there is a delta (difference) between the certification needed for the role determined at 106 and the current certification determined at 108, and it is determined that additional certification would be required then the delta (difference) is communicated to the user to follow the certification process shown at 112.

At 112, certification process is initiated. As an example, an email notification may be sent to the user with the link to the identified certification, for the user to follow the procedure for the identified certification. As another example, the user may be registered automatically and notified to attend a training class (e.g., an online class) for obtaining the certification.

Figure 2:
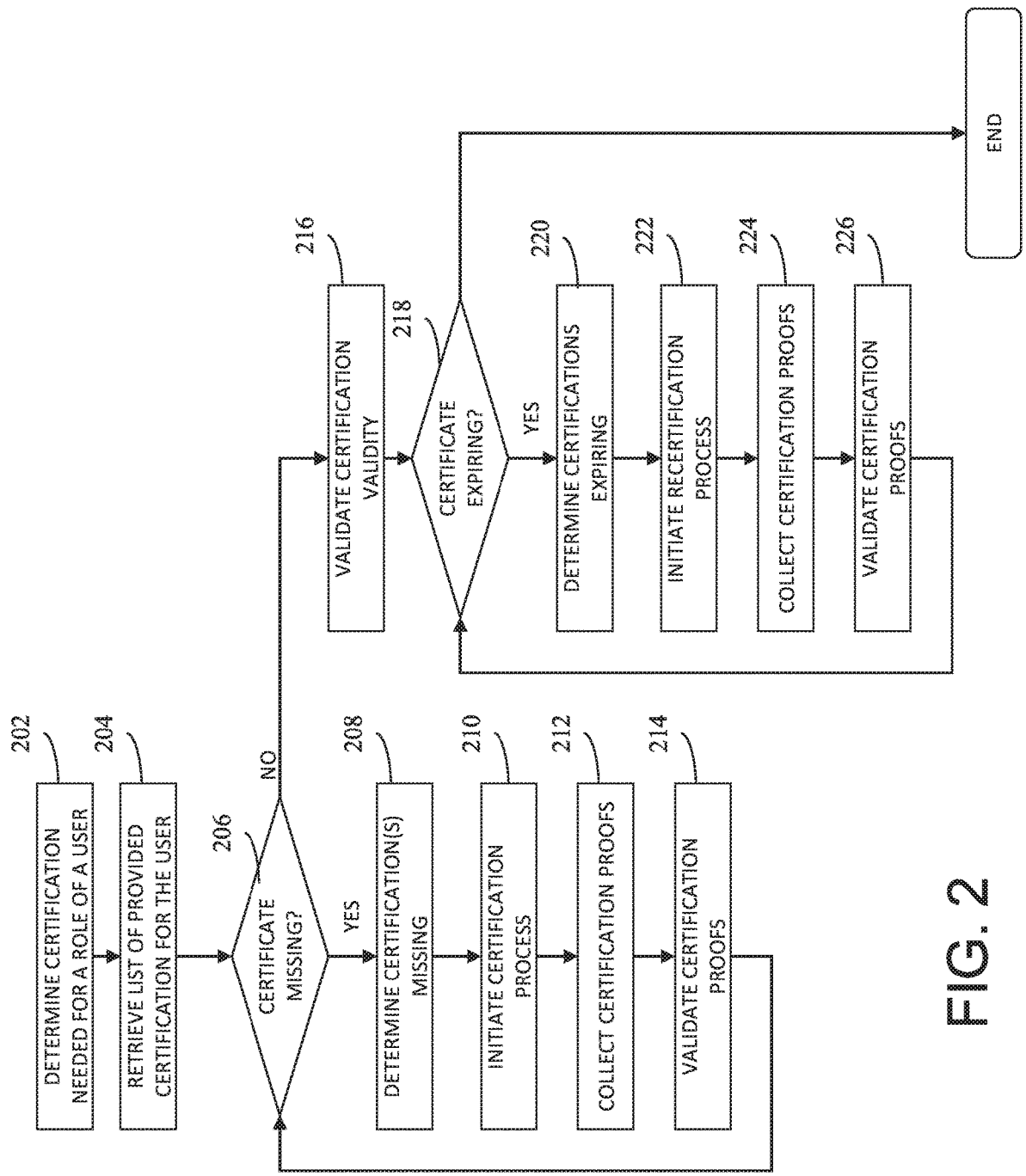
FIG. 2 is a flow diagram illustrating a method of dynamically certifying computer usage by a user in one embodiment of the present disclosure.

FIG. 2 is a flow diagram illustrating a method of dynamically certifying computer usage by a user in one embodiment of the present disclosure. The method may be executed on a computer system including at least one hardware processor. At 202, certification needed for a role of a user may be determined. For instance, there may be a predetermined list of roles and associated certifications that are needed for respective roles, the predetermined list saved or stored in memory or another storage device, which a hardware processor executing the method may retrieve. At 204, a list of provided certifications for the user is retrieved, for example, from a database of users and their certifications. At 206, it is determined whether a certificate is missing. For instance, if a user is performing a role and that role requires a certificate that the user has not been provided with, for example, determined by comparing the list of provided certifications for the user (e.g., the certificate required for performing the role is not in the list of provided certifications for the user), it is determined that the certificate is missing.

Responsive to determining that the certificate is missing, at 208, the missing certification is identified. At 210, certification process is initiated to obtain the missing certification for the user. As an example, an email notification may be sent to the user with the link to the identified certification to perform a procedure for obtaining the identified certification. As another example, the hardware processor executing the method may automatically and/or autonomously register the user for a class (e.g., an online class) for obtaining the certification and notify the user to attend the class, for example, automatically navigating to a web site of a web server on a user's computer.

At 212, certification proofs may be obtained. For example, the user may navigate to or open a specified user interface on the user's computer and submit the proof of certification. As another example, the user may send the certification details via email to a compliance officer. The automated system may automatically retrieve and/or receive the proof. As yet another example, the automated system of the present disclosure in one embodiment, may be integrated with a certification teaching tool (e.g., the online class user was automatically directed to) and responsive to the user completing the certification, the proofs are transmitted automatically to a certification tracking engine of the automated system. For instance, the automated system may automatically receive the proof from the certification teaching tool.

At 214, the obtained certification proofs are validated. For example, the validation may be performed using image recognition. For example, the automated system may look for items in the image of the certification proof via image recognition to validate the proof. As another example, the certification code may be used to validate the submitted certification proof file. For instance, the automated system may compare the certification code with a known code.

For each certificate determined to be missing at 206, the processing at 208, 210, 212 and 214 may be repeated.

If at 206, no certificates are missing, the processing proceeds to 216. At 216, the certification or certifications provided to the user in the role the user is performing is or are validated. The validation for example, includes the processing at 218, 220, 222, 224 and 226. At 218, it is determined whether the certificate is expiring. The processing at 218, 220, 222, 224 and 226 may be repeated for all certifications provided to the user in the role the user is performing. At 218, if it is determined that no certifications are expiring, the process ends.

If at 218, if it is determined that a certification is expiring, the processing proceeds to 220. At 220, the certifications that are expiring are determined. At 222, for the expiring certification, recertification process is initiated. For instance, the automated system may include a daily validator component that periodically (e.g., daily) checks the certificate proof's completion date against the predefined compliance requirements for certification renewal, for example, 1 year or 2 years. If the completion date falls within the predefined interval, then the system requests re-certification via, for example, but not limited to, email or text messaging.

At 224, certification proofs may be obtained. For instance, the user may navigate to a specified user interface and submit the proof of certification, and the automated system of the present disclosure receives the proof of certification. As another example, the user may send the certification details via email to the compliance officer, which the automated system may receive or retrieve (e.g., the compliance officer may save or store the certification proof(s) in memory or another storage device, and the automated system may be triggered to retrieve the certification proof(s) from memory or storage device). As yet another example, the automated system may be integrated with a certification teaching tool. Once the user completes the training associated with the certification, the certification teaching tool may communicate to the automated system that the user completed training. The automated system may retrieve or receive the certification proof from the certification teaching tool. The certification teaching tool may also transmit the certification proof to a certification tracking engine of the automated system.

At 226, the obtained certification proofs are validated. For example, the validation may be performed by image recognition processing, for instance, recognizing items in the image to validate a certification proof. As another example a certification code associated with the certification proof (e.g., received with the certification proof) may be used to validate the submitted certification proof file.

Figure 3:
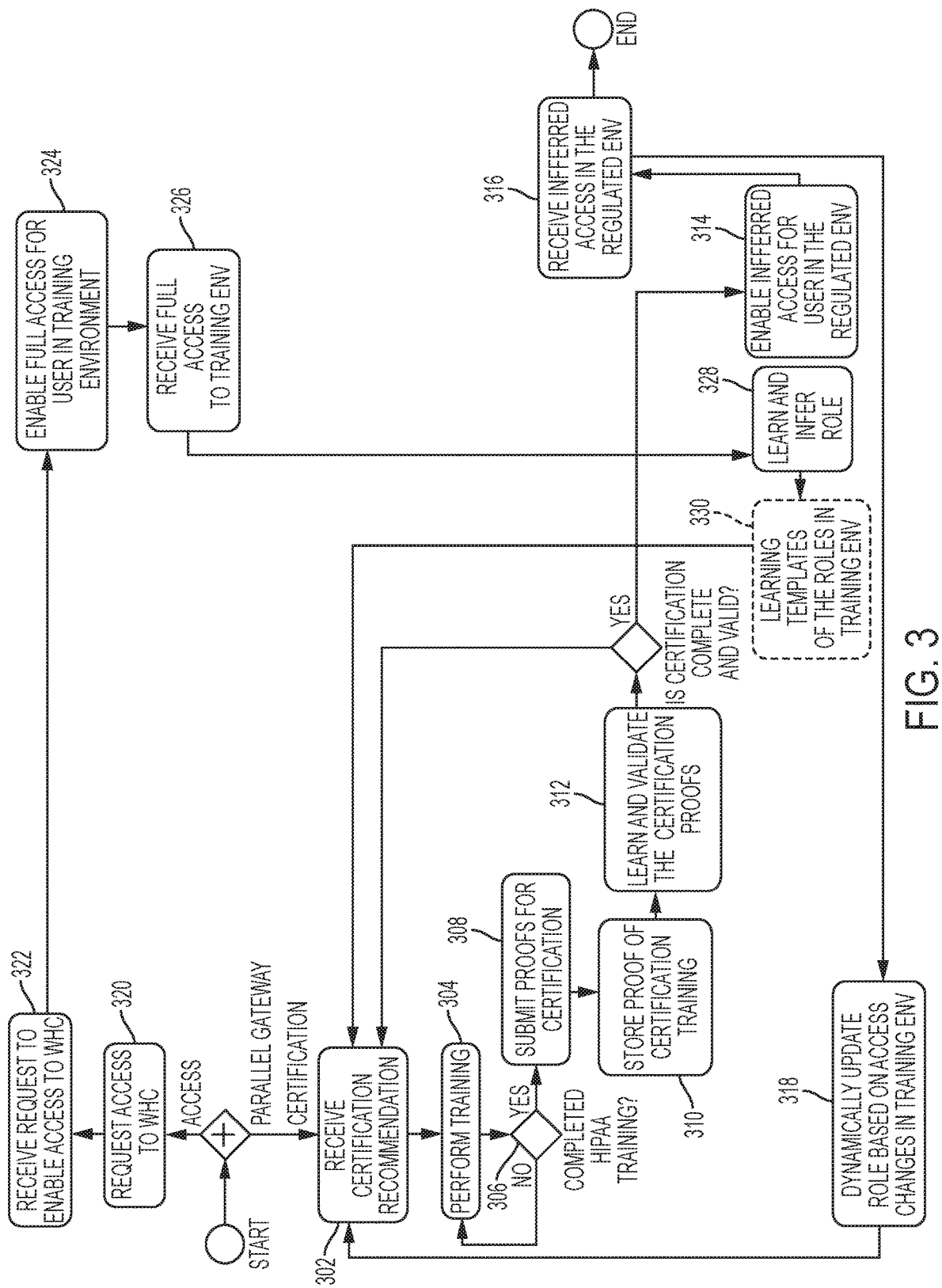
FIG. 3 is a diagram illustrating a workflow in implementation of process steps shown in FIG. 2 in one embodiment of the present disclosure.

FIG. 3 is a diagram illustrating a workflow in implementation of process steps shown in FIG. 2 in one embodiment of the present disclosure. In one embodiment, a process engine (hardware processor) executes the steps. The workflow uses an example scenario, in which a user is accessing a health-related cognitive system, for example, Watson Health™ from International Business Machines Corporation (IBM)®, Armonk, N.Y. An automated system, e.g., dynamic certification system, may be started, and at 302, a user may receive certification recommendation, for example, as described above with reference to FIG. 1 and FIG. 2. At 304, the user may be directed or guided to perform training needed for certification. Consider as example, that the certification needed is for HIPAA compliance. As shown at 306, for example, the training 304 continues until the training needed for HIPAA is complete. At 308, the user may submit a proof that the user completed the training. In another aspect, the automated system may automatically retrieve the proof, for example, from a training tool. At 310, the automated system stores the proof of certification training. At 312, the certification proof is validated, for example, as discussed above. If the certification is not validated, the processing may iterate, for example, return to 302, where the user is again provided with certification recommendation. If the certification is valid, at 314, the automated system enables the user to access a computing environment (which requires certification) or perform a given role (which requires the certification). At 316, the user is provided with access. At 318, user role may be dynamically updated based on access changes in training environment (sandbox).

The user may attempt to access a target system (e.g., the health-related cognitive system), for example, by requesting access at 320. In one embodiment, the target system (e.g., the health-related cognitive system) at 322 may receive the access request and at 324, allow the user full access in the training system (sandbox, or test environment). The user at 326 receives the full access to the sandbox. While the user is operating in the sandbox, the automated system learns and infers user role at 328, for instance, determines the role of the user based on the user's activities on the sandbox. At 330, based on the determined or inferred role of the user, one or more certifications the user may need to act in that role in the target system's full production system are determined, and provided to the user (e.g., as shown at 302).

In one embodiment, role determination at 104 in FIG. 1 may be performed by machine learning. A sandbox (testing environment) monitoring for example determines the role. The monitoring of the sandbox environment is used to infer a new role that the user may need, while monitoring of the production environment is used to detect intrusion and raise security alerts if the user is not in compliance.

For instance, if the user is using sudo, a program for Unix-like computer operating system, it is determined that the user is fulfilling an operator role. If the user is using DevOps (a software development and delivery process) portals, it is determined that the user is fulfilling a developer and/or a tester role. If the user is accessing applications or services that are financial, health care, or legal related, the system can further differentiate the requirement for training by comparing the Uniform Resource Locator (URL) accessed in a browser or software installed on the computer the user is using, with the predefined categories which describe the Uniform Resource Locator (URL) and software compliance.

The system and method in one embodiment enables to define a process, and to collect artifacts needed for the process. The process may be defined with a flowchart, defining dependency between different steps, and their flow. A step can be one or more of the following: sending a mail, registering that a mail is received, verifying that information received is as expected, and saving received files or the mail itself into a document repository such as email application database or another database.

The system and method in one embodiment may ingest a list of user names and roles, specify requirements (training, proofs) for each role. The system and method in one embodiment may get information from other systems with data (e.g., organization directory and/or training sites), create a user name and password pair, and verify that user names are unique. The system and method in one embodiment may determine expiration of training or credentials, and send reminders for refreshing. The bodies of compliance may have predefined policies for password expiration, access duration, training renewal. The automated system of the present disclosure in one embodiment supports storage of this information, to identify the associated actions.

As part of the certification process, the automated system of the present disclosure in one embodiment recommends the user optimal calendar for taking the certification (training to obtain the certification). This is accomplished by comparing the user's calendar available in the enterprise to the duration of the classes as available in the certification teaching tool; e.g., by comparing the meeting load versus vacation versus sleep cycles to minimize the certification overhead within the grace period within which to complete the certification. In one embodiment, the time of the training may be determined, e.g., based on the user's calendar (electronic calendar), and the user may be automated registered for the training for that time. On the date, and the time of the training, the automated system in one embodiment of the present disclosure may automatically connect the user's computer or device (used in training) to a target website (e.g., automatically open and navigate a web browser to the target website, open a webpage) or training tool (e.g., automatically execute the training application or the like), so that the user is able to begin the training.

Figure 4:
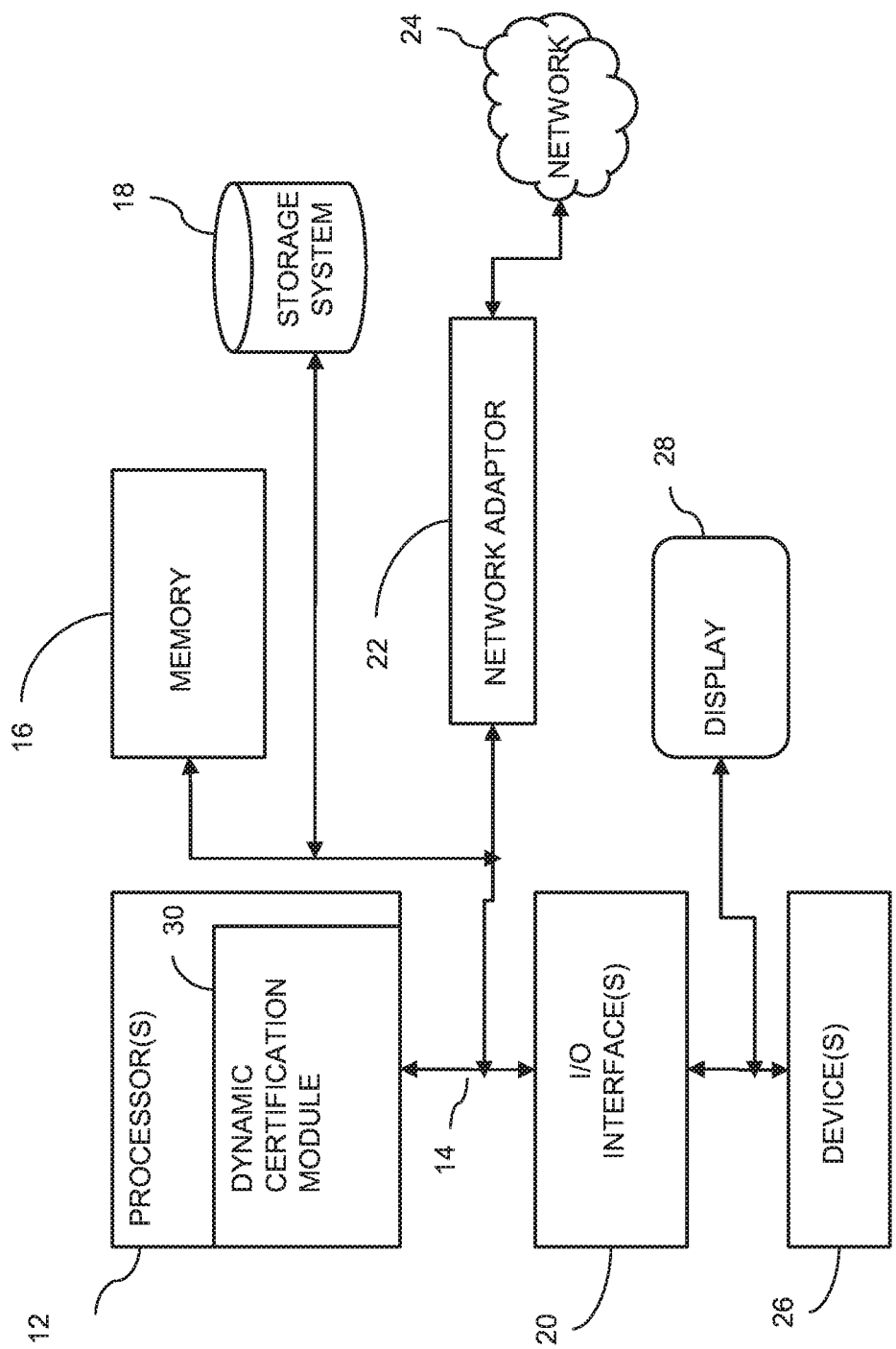
FIG. 4 illustrates a schematic of an example computer or processing system that may implement a dynamic certification system in one embodiment of the present disclosure.

FIG. 4 illustrates a schematic of an example computer or processing system that may implement a dynamic certification system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a dynamic certification module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of protecting computer security by dynamic computer system certification, the method executed by at least one hardware processor, the method comprising:
    intercepting commands executed on a computer system, and directing the commands to execute in a sandbox environment of the computer system, wherein a full access to execute commands is allowed in the sandbox environment;
    based on the intercepted commands, inferring a role of a user associated with the commands by running a machine learning model with input including at least the intercepted commands, the inferring including at least determining what role the user is fulfilling on the computer system and determining whether the intercepted commands include a computer operating system command;
    determining certification required for the role;
    determining whether the user has the certification sufficient for the role; and
    responsive to determining that the user does not have the certification sufficient for the role, initiating a certification process, the certification process comprising determining a time for training based on the user's electronic calendar, automatically registering the user for the training on a training system, and at the time of the training, automatically causing a user device to connect to a target website associated with the training system to allow the user to begin the training,
    responsive to the user completing the training, collecting a proof of the certification and validating the proof by performing an image recognition processing of an item in the proof, and responsive to validating the proof, allowing the user access to a production environment,
    wherein the commands being executed in the sandbox environment of the computer system determines a new role that the user needs in the production environment, and based on the user's operations in the sandbox environment, the user's role is dynamically updated for operating in the production environment.

2. The method of claim 1, further comprising automatically executing a training tool.

3. The method of claim 1, wherein the validating the proof of the certification comprises determining whether the certification is expiring and responsive to determining that the certification is expiring, automatically initiating a recertification process.

4. The method of claim 3, wherein the automatically initiating the recertification process comprises determining training needed for the recertification and causing the user to perform the training by automatically causing the user device to connect to the training system.

5. The method of claim 4, further comprising obtaining a recertification proof and validating the recertification proof.

6. A computer program product for protecting computer security by dynamic computer system certification, the computer program product comprising a computer readable storage medium having program instructions embodied therewith, wherein the computer readable storage medium is not a transitory signal per se, the program instructions readable by a device to cause the device to perform a method comprising:
intercepting commands executed on a computer system, and directing the commands to execute in a sandbox environment of the computer system, wherein a full access to execute commands is allowed in the sandbox environment;
based on the intercepted commands, inferring a role of a user associated with the commands by running a machine learning model with input including at least the intercepted commands, the inferring including at least determining what role the user is fulfilling on the computer system and determining whether the intercepted commands include a computer operating system command;
determining certification required for the role;
determining whether the user has the certification sufficient for the role; and
responsive to determining that the user does not have the certification sufficient for the role, initiating a certification process, the certification process comprising determining a time for training based on the user's electronic calendar, automatically registering the user for the training on a training system, and at the time of the training, automatically causing a user device to connect to a target website associated with the training system to allow the user to begin the training,
responsive to the user completing the training, collecting a proof of the certification and validating the proof by performing an image recognition processing of an item in the proof, and responsive to validating the proof, allowing the user access to a production environment,
wherein the commands being executed in the sandbox environment of the computer system determines a new role that the user needs in the production environment, and based on the user's operations in the sandbox environment, the user's role is dynamically updated for operating in the production environment.

7. The computer program product of claim 6, further comprising automatically executing a training tool.

8. The computer program product of claim 6, wherein the validating the proof of the certification comprises determining whether the certification is expiring and responsive to determining that the certification is expiring, automatically initiating a recertification process.

9. The computer program product of claim 8, wherein the automatically initiating the recertification process comprises determining training needed for the recertification and causing the user to perform the training by automatically causing the user device to connect to the training system.

10. The computer program product of claim 6, wherein a machine learning algorithm is executed to determine the role of the user.

11. A computer security system with dynamic computer system certification, comprising:
at least one hardware processor intercepting commands executed on a computer system, and directing the commands to execute in a sandbox environment of the computer system, wherein a full access to execute commands is allowed in the sandbox environment;
based on the intercepted commands, the at least one hardware processor inferring a role of a user associated with the commands by running a machine learning model with input including at least the intercepted commands, the inferring including at least determining what role the user is fulfilling on the computer system and determining whether the intercepted commands include a computer operating system command;
the at least one hardware processor determining certification required for the role;
the at least one hardware processor determining whether the user has the certification sufficient for the role; and
responsive to determining that the user does not have the certification sufficient for the role, the at least one hardware processor initiating a certification process, the certification process comprising determining a time for training based on the user's electronic calendar, automatically registering the user for the training on a training system, and at the time of the training, automatically causing a user device to connect to a target website associated with the training system to allow the user to begin the training,
responsive to the user completing the training, the at least one hardware processor collecting a proof of the certification and validating the proof by performing an image recognition processing of an item in the proof, and responsive to validating the proof, the at least one hardware processor allowing the user access to a production environment,
wherein the commands being executed in the sandbox environment of the computer system determines a new role that the user needs in the production environment, and based on the user's operations in the sandbox environment, the user's role is dynamically updated for operating in the production environment.

12. The system of claim 11, further comprising automatically executing a training tool.

13. The system of claim 11, wherein the validating the proof of the certification comprises determining whether the certification is expiring and responsive to determining that the certification is expiring, automatically initiating a recertification process.

14. The system of claim 13, wherein the automatically initiating the recertification process comprises determining training needed for the recertification and causing the user to perform the training by automatically causing the user device to connect to the training system.

\* \* \* \* \*